United States Patent Office 2,955,965
Patented Oct. 11, 1960

2,955,965

RAPID REMOVAL OF ORGANIC COATINGS FROM TIN PLATE

Charles H. Coleman, Aurora, Ill., assignor to the United States of America as represented by the Secretary of the Army No Drawing. Filed Jan. 12, 1960, Ser. No. 2,081

7 Claims. (Cl. 134—38)

(Granted under Title 35, U.S. Code (1952), sec. 266)

The invention described herein, if patented, may be manufactured and used by or for the Government for governmental purposes, without the payment to me of any royalty thereon.

This invention concerns a rapid method for removing organic coatings from tin plate, such as lacquered tin cans.

Testing laboratories are often called upon to determine the weight of tin plate on a steel base, as in the case of tin cans. A large proportion of these cans is produced with one or more layers of lacquer, baked enamel, resin, or other organic material over the tin plate. Cans are coated internally so that the tin will not affect the product packed nor be affected by it. Exterior coatings help protect the can from corrosive effects of the elements, and serve as camouflage as well as a base for labeling or lithographing. In order to determine the weight of tin plate, it is necessary to remove the organic coating. Removal must not affect the tin quantitatively and it should be accomplished rapidly to expedite analysis of tin.

Numerous experiments were conducted at the Military Subsistence Testing Laboratory of the Military Subsistence Supply Agency, Chicago, Illinois, with a wide variety of solvents and protective coating removers in efforts to strip organic coatings from tin cans in a rapid and efficient manner. In some cases, the stripping action amounted to no more than a slight discoloration of the agent being tested, while in other tests, slow removal was effected.

It was found by me in the course of these experiments that a hot aqueous solution of aniline and ammonia rapidly strips organic coatings from tin plate without attacking the metal. The tin can or other tin plate is immersed in the hot solution preferably near the boiling point, resulting either in the floating off of the organic coating, or loosening it to such a degree that it can be easily removed by a spatula. Because of the development of ammonia and aniline vapors, it is preferable to conduct this operation under a hood.

The preferred concentration of aniline is about 10 ml. per 100 ml. of ammonia solution (aqueous ammonium hydroxide), and the preferred optimum ammonia content of the solution was found to be 12%. It will be understood, however, that highly satisfactory stripping action can be obtained at concentrations which vary somewhat from these optimum concentrations, say, by about ±50%; thus, about 5–15 ml. of aniline per 100 ml. of ammonia solution, and ammonia concentrations of about 6–18% in aqueous solution are also effective. The temperature of the solution may also be lower than the boiling point, e.g., about 80° C., which results in a somewhat slower stripping of the organic coating than at the preferred near-boiling temperature. Immersion in the hot solution may also be accomplished by placing the tin plate into the solution at room temperature and heating the solution.

Generally speaking, the proportion of concentration of ammonia should not exceed 12% when the solution is used near its boiling point, because of evaporation loss.

The solution is rather unstable and therefore should be prepared immediately before use, by adding the aniline to the aqueous ammonia solution (ammonium hydroxide solution).

A one to three-minute immersion is usually sufficient to remove the organic coating. However, the immersion may be extended or repeated for an additional period or periods until the organic coating is removed, without attacking the tin plate.

The following table illustrates the rapidity and efficiency of my preferred method:

| Type of resinous coating on tin plate: | Removal time in seconds |
|---|---|
| Oleoresinous | 12 |
| Butoxy | 45 |
| Epon | 90 |
| Phenolic | 240 |

The phenolic coating resisted removal from the tin plate by any other method, but was removed in less than five minutes by the method of the present invention. My tests at the Military Subsistence Testing Laboratory have shown that aqueous solutions of aniline and ammonia are much more efficient than solutions in organic solvents, and I therefore deem the use of water as the solvent to be an important aspect of my invention.

It will thus be seen that the present invention provides an efficient method for quickly removing organic coatings from tin-plated steel, without attacking the metal, so that the stripped metal may be subjected to analysis, or otherwise processed, e.g., by superposing a new organic coating onto the stripped metal base. While a preferred method of carrying the invention into practice has been disclosed, it will be understood that it is not desired to limit the scope of the invention to any specific conditions set forth therein, inasmuch as modifications within the spirit of the invention will readily occur to the expert. The scope of the invention is therefore defined in accordance with the patent statutes by the appended claims.

I claim:

1. A method of rapidly removing an organic coating from tin plate without attacking the metal, comprising immersing the coated tin plate in a hot solution of aniline and ammonia in water.

2. Method according to claim 1 wherein said aniline is present in an amount of about 10 ml. per 100 ml. of said solution.

3. Method according to claim 1, wherein said solution contains about 12% ammonia.

4. Method according to claim 2, wherein said solution contains about 12% ammonia.

5. Method according to claim 3, wherein said solution is near its boiling point.

6. Method according to to claim 4, wherein said solution is near its boiling point.

7. A method of rapidly removing an organic coating from tin plate without attacking the metal, comprising immersing the coated tin plate in a solution of aniline and ammonia in water, said solution being near its boiling point.

References Cited in the file of this patent

UNITED STATES PATENTS

| 2,242,106 | Buckman | May 13, 1941 |
| 2,854,361 | Fulkerson | Sept. 30, 1958 |

FOREIGN PATENTS

| 10,497 | Great Britain | of 1914 |